United States Patent [19]

Murata et al.

[11] 4,213,186
[45] Jul. 15, 1980

[54] PULSE INTERPOLATION SYSTEM

[75] Inventors: Kazuo Murata; Terukazu Kito, both of Tokyo, Japan

[73] Assignee: Oki Electric Industry Co., Ltd., Tokyo, Japan

[21] Appl. No.: 932,186

[22] Filed: Aug. 8, 1978

[30] Foreign Application Priority Data

Aug. 19, 1977 [JP] Japan .................................. 52-98768

[51] Int. Cl.² ............................................. G06F 15/46
[52] U.S. Cl. .................................. 364/723; 318/573; 364/701
[58] Field of Search .............. 364/723, 701, 107, 117; 318/573

[56] References Cited

U.S. PATENT DOCUMENTS

| | | | |
|---|---|---|---|
| 3,590,226 | 6/1971 | Lane ................................. | 364/573 X |
| 3,911,258 | 10/1975 | Kishi et al. ...................... | 364/701 |
| 4,031,369 | 6/1977 | Heaman ........................... | 364/723 X |
| 4,059,746 | 11/1977 | Haga ................................ | 364/723 X |
| 4,125,897 | 11/1978 | Murata et al. ................... | 364/702 |

OTHER PUBLICATIONS

Henegar, "New Continuous Path System Uses DDA Interpolator", *Control Engineering*, Jan. 1961, pp. 71-76.

*Primary Examiner*—David H. Malzahn
*Attorney, Agent, or Firm*—Frailey & Ratner

[57] ABSTRACT

The prior D.D.A. (Digital Differential Analyzer) having an integrand register, a remainder register and an adder for pulse interpolation has been improved by attaching some new units to the same, including a counter for counting the reference instruction pulses, a register for storing the content of the counter, and a multiplier for providing the product of the content of said register and the content of said integrand register. The product provided by the multiplier instead of the output of the integrand register, is applied to one input of the adder, the other input of which receives the output of said remainder register. Thus, the interpolation calculation has only to be performed once in every several periods of the instruction pulses, therefore, a slow speed digital element can be utilized for high speed instruction calculation.

5 Claims, 25 Drawing Figures

PULSE INTERPOLATION SYSTEM

BACKGROUND OF THE INVENTION

The present invention relates to a pulse interpolator in a numerical control system, and in particular, relates to a pulse interpolator in which a slow speed circuit can provide high speed interpolation pulses.

Pulse interpolators are utilized in, for instance, N.C. (Numerical Control) systems, graph plotters, and/or machines for automatic drawing.

A prior pulse interpolator operated on the principle of D.D.A. (Digital Differential Analyzer), which has a first or integrand register (IR), a second or remainder register (RR), and an adder. Every time an input instruction pulse is applied to the D.D.A. system the content of the register (RR) and the content of the register (IR) are added in said adder, and the sum is stored in the register (RR) again. If the register (RR) overflows during the addition, the overflow pulse operates as an interpolation pulse. An interpolation pulse thus obtained is applied to a drive circuit for moving a bit, a pen etc. Supposing that the initial content of the integrand register (IR) is (a) and the number of input instruction pulses in (T) seconds is $2^n$ (where n is the number of bits of the integrand register), then the number of the overflow pulses (interpolation pulses) obtained in (T) seconds is (a). That is to say, a train of interpolation pulses, the frequency or the speed of which relates to the value (a) in the integrand register, is obtained.

Figure 1:
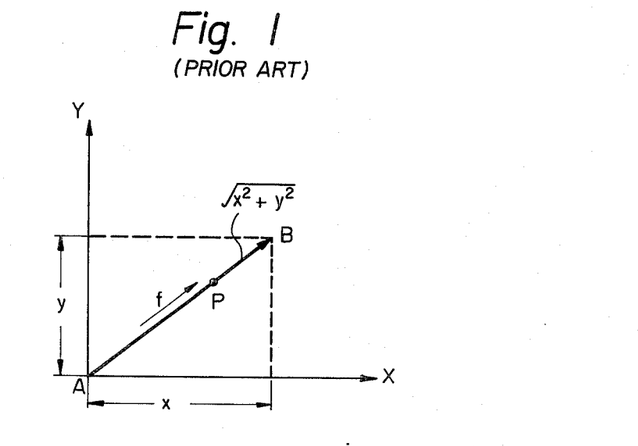
FIG. 1 is an explanatory drawing of the pulse interpolation.
Figure 2:
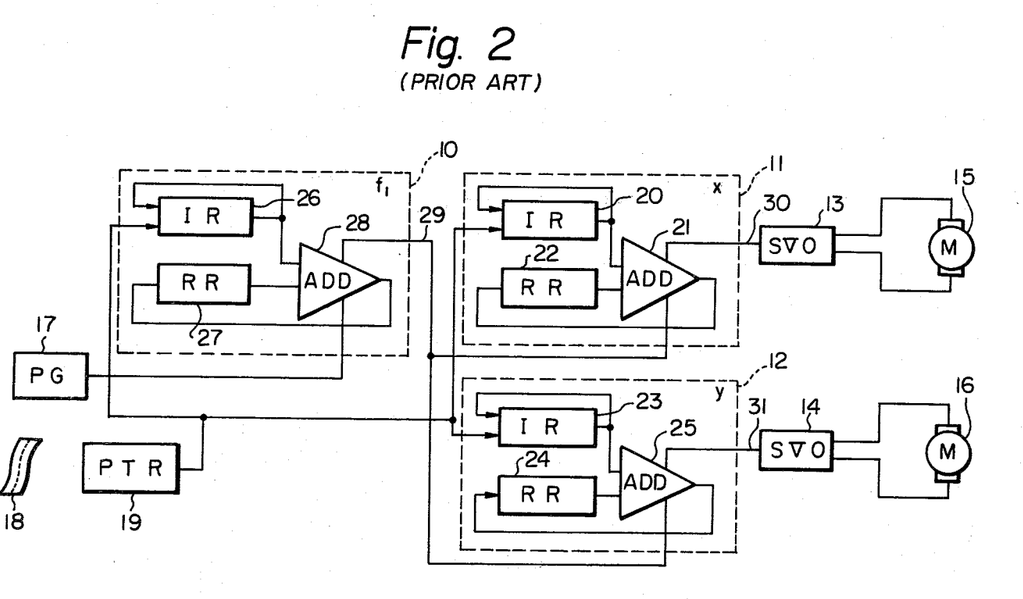
FIG. 2 is a block-diagram of the prior pulse interpolation circuit.

Now, the practical prior pulse interpolator is explained in accordance with FIG. 1 and FIG. 2 to facilitate understanding of the present invention.

Supposing that the point P moves from the point A to the point B as shown in FIG. 1, and the moving instruction in the x-direction is $x_{mm}$, the moving instruction in the y-direction is $y_{mm}$, and the moving speed instruction is $f_{mm}$/sec.

FIG. 2 is the block-diagram of the prior interpolation system for carrying out the above interpolation. The values x and y are read from paper tape. Concerning the moving speed, the value $$f_1 = f \cdot 2^n / \sqrt{x^2 + y^2}$$

is calculated in an external device and the result ($f_1$) is read from the paper tape. The reference numeral 10 is an interpolator for the moving speed $f_1$, the reference numeral 11 is an interpolator for the instruction in the x-direction, 12 is an interpolator for the instruction in the y-direction, 15 is the x-axis drive motor of a machine, 16 is the y-axis drive motor of a machine, 13 is a servo-circuit for controlling the drive motor 15, 14 is a servo-circuit for controlling the drive motor 16 and 17 is a pulse generator for generating the reference pulses.

The moving instruction x read by the paper tape reader 19 is stored in the integrand register 20, the moving instruction y is stored in the integrand register 23, and the velocity instruction $f_1$ is stored in the integrand register 26. The reference numerals 22, 24 and 27 are remainder registers, 21, 25 and 28 are adders.

When an instruction pulse is generated by the pulse generator 17, the adder 28 performs addition of the content of the integrand register 26 and the remainder register 27. The sum of the addition is re-stored in the remainder register 27, and the carry generated in that addition is provided on the output line 29 as an interpolation pulse. It should be appreciated that the number and/or the frequency of a train of interpolation pulses on the line 29 is defined by the value $f_1$.

The interpolation pulses on the line 29 function as an instruction pulse for the interpolation circuits 11 and 12, and the adders 21 and 25 perform addition each time the interpolation pulse appears on the line 29. When the $2^n$ number of additions are carried out by the adders 21 and 25 respectively, the interpolator 11 provides the x-number of interpolation pulses on the output line 30, and the interpolator 12 provides the y-number of interpolation pulses on the output line 31. Those interpolation pulses on the lines 30 and 31 are applied to the drive motors 15 and 16 respectively, through the servo circuits 13 and 14 respectively. Then, the motors 15 and 16 move the point P from the point A to the point B, at the velocity of $f_{mm}$/second.

However, the prior interpolator shown in FIG. 2 has the disadvantages that three interpolators 10, 11 and 12 are necessary. The structure of those interpolators is complicated and their operational speed must be high. When the period of an instruction pulse is 1 μm, and the moving speed is 10 m/second, the time required for a single interpolation calculation in each interpolator must be less than 10 μs. As a result, an expensive, high speed digital element is necessitated for the interpolation calculation.

SUMMARY OF THE INVENTION

It is an object, therefore, of the present invention to overcome the disadvantages and limitations of prior pulse interpolators by providing a new and improved pulse interpolator.

The above and other objects are attained by a pulse interpolation system comprising; a pulse generator for providing reference instruction pulses, a counter for counting the pulses from the pulse generator, and being reset to zero when providing the output of the same, a register for storing the content of said counter, a first register group for storing a predetermined value from a programmed instruction tape, a second register group for storing a temporary value, a multiplier for providing the product of the output of the first register group and the output of said register, an adder for obtaining the sum of the content of the second register group and the product of said multiplier and applying the remainder of the sum of the addition to said second register group with the integer part of the addition producing an output interpolation numeral, a converter for changing said interpolation numeral to an interpolation pulse train, means responsive to said converter for operating through an interpolation cycle.

BRIEF DESCRIPTION OF THE DRAWINGS

The foregoing and other objects, features, and attendant advantages of the present invention will be appreciated as the same become better understood by means of the following description and accompanying drawings wherein;

FIG. 3 (a–d) shows the interpolation pulses according to the present invention;

FIG. 6 (a–g) is a time chart for explaining the operation of the apparatus in FIG. 2, and FIG. 7 (a–j) is a time chart for explaining the operation of the apparatus in FIG. 4.

DESCRIPTION OF THE PREFERRED EMBODIMENTS

Figure 3:
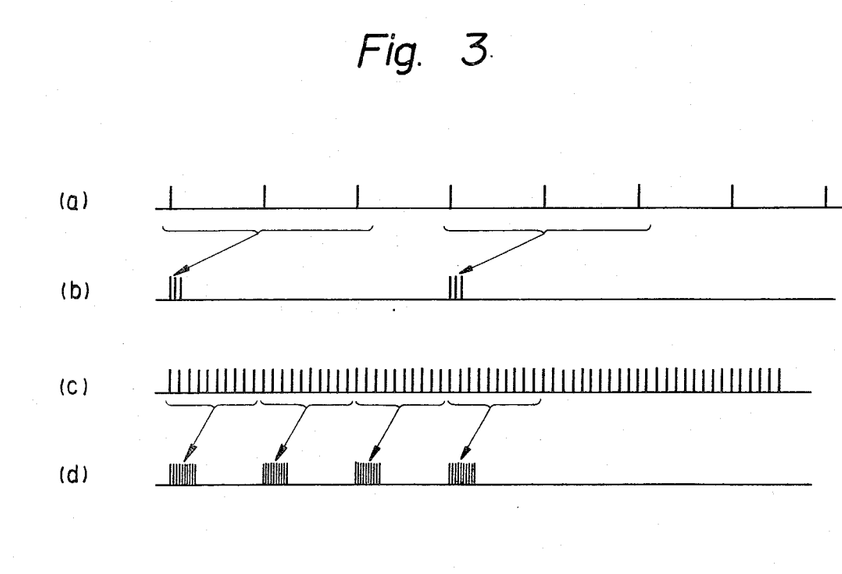

When we cut a work piece using a machine tool with a low cutting speed, we must apply uniform interpolation pulses as shown in FIG. 3(a) to a servo-circuit to drive a motor. If we apply non-uniform interpolation pulses as shown in FIG. 3(b), in which a predetermined number of pulses are applied in a short time, the cut surface will not be smooth, but rather will be streaky. Accordingly, a prior pulse interpolator provides interpolation pulses the duration of which are almost constant. On the contrary, when the cutting speed is high, the frequency of the interpolarion pulses becomes high as shown in FIG. 3(c), and a plurality of interpolation pulses can be applied to a machine tool as shown in FIG. 3(d) and a smooth cut surface can be obtained, since a drive motor for moving a table of machine tool has some inertia, and the amplitude of a servocircuit is designed to be small at high frequencies for stable operation.

Accordingly, the present invention utilizes the above nature of machine tools, and provides uniform interpolation pulses as shown in FIG. 3(c) when the cutting velocity is low, and provides a plurality of interpolation pulses in a short time as shown in FIG. 3(d) when the cutting velocity is high. Thus, the present invention always provides a smooth cut surface, and a cheap digital element, the operational speed of which is not high, can be utilized in the present invention. Further, each calculation time for interpolation is constant in the present invention in spite of changes in the speed of the instruction pulses. Further, the duration between each interpolation calculation can be arbitrary designed, therefore, a mini-computer or a micro-computer can carry out an interpolation calculation, and a computer can be utilized for another job. Accordingly, the present invention is very beneficial for use in CNC (Computer Numerical Control) systems.

In the following embodiment, an interpolation system for two axes (x-axis and y-axis) will be explained for the sake of simplicity. However, it should be appreciated, of course, that the present invention can have an arbitrary number of axes.

Figure 4:
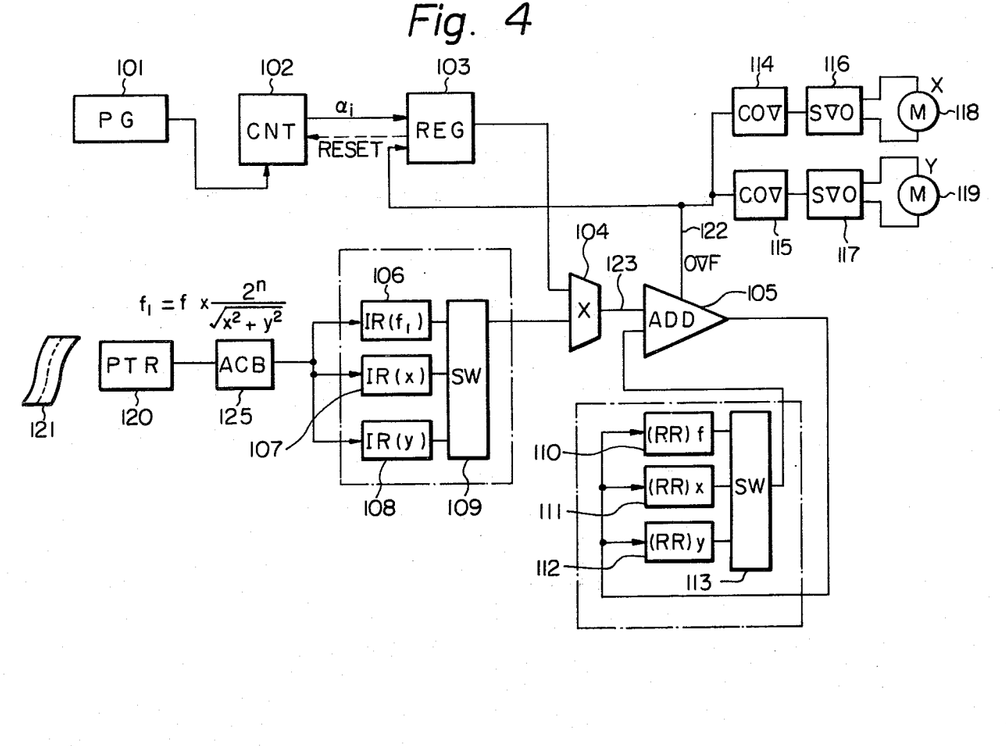
FIG. 4 is a block-diagram of the pulse interpolation circuit according to the present invention.

FIG. 4 shows a block-diagram of the interpolation system according to the present invention. In the figure, the reference numeral 101 is a reference pulse generator for generating an instruction pulse, 102 is a counter for counting the number of pulses from the pulse generator 101, 103 is a register for storing the content of the counter 102 and for storing the output of the adder 105 through the output line 122. When the content of the counter 102 is transferred to the register 103, the counter is reset to zero and resumes counting instruction pulses. The reference numeral 121 is a paper tape having the program concerning the moving instructions and the moving velocity, 120 is a paper tape reader for reading the information on the paper tape 121, 125 is an arithmetic control block which transfers the instructions on the paper tape to each register and calculates the value $$f_1 = f \times 2^n / \sqrt{x^2 + y^2}$$

for the velocity instruction (f) where n is the number of figures (bit positions) of each registers, x and y are moving instruction in the X and Y directions respectively. The reference numeral 106 is an integrand register for storing the velocity instruction $$f_1 \left( = f \times \frac{2^n}{\sqrt{x^2 + y^2}} \right),$$

107 is an integrand register for storing the moving instruction x in the X direction, 108 is an integrand register for storing the moving instruction y in the Y direction, 110 is a remainder register for storing the remainder in the interpolation calculation of the velocity instruction ($f_1$), 111 is a remainder register for storing the remainder in the interpolation calculation of the moving direction in the X-direction, 112 is a remainder register for storing the remainder in the interpolation calculation of the moving instruction in Y-direction. The registers 106, 107, 108, 110, 111 and 112 have n number of bit positions and can store binary figures up to $2^n - 1$. The reference numeral 109 is a switching circuit for selectively applying one of the outputs of the registers 106, 107 and 108 to one input of the multiplier 104. The reference numeral 113 is another switching circuit for selectively applying one of the outputs of the registers 110, 111 and 112 to one input of the adder 105. The multiplier 104 provides the product of the content of the register 103 and the output of the switching circuit 109 and said product is applied to the other input of the adder 105. The adder 105 provides the sum of the output of the multiplier 104 and the output of the switching circuit 113, and when the addition provides an overflow bit, the overflow bit is applied to the output line 122. It should be appreciated that when the sum is larger than or equal to $2^n$, the adder 105 provides an overflow bit, since the adder and each register have only n number of bit positions. The sum of the addition is re-stored in one of the registers 110, 111 or 112. The output line 122 is connected to the registers 103, and the converters 114 and 115, and then the signal on said output line 122 is applied to either said register 103, or converters 114 or 115. 114 and 115 are converters for converting a binary code to a pulse train. 116 is a servo circuit which controls the drive motor 118 according to the interpolation pulses from the converter 114. The drive motor 118 controls the x-axis of a machine tool. 117 is also a servo-circuit which controls the drive motor 119 according to the interpolation pulses from the converter 115, and the drive motor 119 controls the Y-axis of a machine tool.

Now, the operation of the apparatus in FIG. 4 will be explained.

It is assumed that the moving instruction from the point A to the point B is instructed, that is to say, the moving length in the X-direction is $x_{mm}$, the moving length in the Y-direction is $y_{mm}$, and the moving velocity is $f_{mm}$/second as shown in FIG. 1. Those instructions are punched on paper tape 121, and are read out by the paper tape reader 120. The value x is stored in the integrand register 107, the value y is stored in the integrand register 108, and the value f is converted to the value $f_1$ in the arithmetic control block 125 through the formula $$f \times \frac{2^n}{\sqrt{x^2 + y^2}} = f_1 \quad (1)$$

The resultant value $f_1$ is stored in the integrand register 106.

It should be appreciated that the adder 105 must perform substantially $2^n$ times of addition in order to obtain all the interpolation pulses in either the X- or Y-directions, since each register has n number of bit positions.

Next, it takes the time (t) shown in the formula below to go to the point B from the point A in FIG. 1, $$t = \frac{\sqrt{x^2 + y^2}}{f} \quad (2)$$

It is assumed that the pulse repetition frequency of the pulse generator 101 is $2^n$ Hz, and the number (m) of pulses that the pulse generator 101 must provide to move from the point A to the point B is;

$$m = 2^n \times \frac{\sqrt{x^2 + y^2}}{f} \quad (3)$$

That is to say, m number of instruction pulses provide $2^n$ number of velocity interpolation pulses during the time (t), and that $2^n$ number of velocity interpolation pulses provide (x) number of X-axis interpolation pulses and (y) number of Y-axis interpolation pulses.

It should also be appreciated that the value m can be expressed as shown in the formula (4), $$m = \alpha_1 + \alpha_2 + \alpha_3 + \ldots + \alpha_K \quad (4)$$
$$= \sum_{i=1}^{k} \alpha_i$$

where $\alpha_1, \alpha_2, \alpha_3, \ldots \alpha_k$ are positive integers. That is to say, the m number of pulses are grouped into (k) groups and of course (k) is smaller than (m).

According to the present invention, the interpolation circuit performs interpolation calculations only (k) times, and that is substantially the same as (m) times in a prior art.

The counter 102 counts the pulses from the pulse generator 101, and the content of the counter 102 is designated as the value $\alpha_i$ in the formula (4). The content ($\alpha_i$) of the counter 102 is transferred to the register 103, and when the register 103 receives the value $\alpha_i$, the counter 102 is reset to zero. Then the counter 102 resumes counting the pulses from the pulse generator 101.

Next, when the register 103 receives the value $\alpha_i$, the multiplier multiplies the content ($\alpha_i$) of the register 103 and the content ($f_1$) of the integrand register 106 as follows:

$$f_1 \times \alpha_i$$

The adder 105 adds the product of said multiplication and the content of the remainder register 110. In the sum of this addition, the integer equal to or larger than $2^n$ is re-stored in the register 103, and the portion less than $2^n$ (a fraction part) is re-stored in the remainder register 110. Since the initial value of the remainder register 110 is zero, the above calculation is expressed as follows.

$$f_1 \times \alpha_1 \times 1/2^n = (\text{Integer}) + \left(\frac{\text{value less than } 2^n}{2^n}\right) \quad (5)$$

It should be appreciated in the formula (5) that the integer is stored in the register 103 as a velocity interpolation pulse and the value less than $2^n$ is stored in the register 110. The content of the register 103 is then utilized for the interpolation calculation of the X- and Y-axes.

For the interpolation calculation of the X-axis, the content of the register 103 and the content (x) of the integrand register 107 are multiplied in the multiplier 104, and the adder 105 adds the content of the remainder register 111 to the product of said multiplication. In the multiplication and addition, the integer part equal to or larger than $2^n$ is applied to the converter 114, and the fraction part which is less than $2^n$ is re-stored in the remainder register 111. The converter 114 converts the integer thus received to a pulse train, which is applied to the drive motor 118 as interpolation pulses for the X-axis through the servo-circuit 116.

Next, the interpolation calculation for the Y-axis is performed using the content of the register 103, the integrand register 108 and the remainder register 112 in a similar way as for the X-axis, and the interpolation pulses for the Y-axis are applied to the drive motor 119.

Next, the above interpolation calculation will be mathematically explained.

The formula (5) which concerns the first interpolation calculation is equivalent to the formula (6).

$$f_1 \times \alpha \times \tfrac{1}{2}^n = F_1 + F_{r1}/2^n \quad (6)$$

where $F_1$ is the integer part equal to or larger than $2^n$ of ($f_1 \times \alpha_1 \times \tfrac{1}{2}^n$) and $F_{r1}$ is the remainder in the formula (6) and is the value less than $2^n$.

The integer $F_1$ is stored in the register 103, and said integer $F_1$ is utilized for the interpolation calculation of both the X-axis and the Y-axis. That is to say, the multiplier 104 carries out the multiplication of the content of the register 103 and the content of the integrand register 107 for the X-axis interpolation, and further the adder 105 adds the product of said multiplication and the content of the remainder register 111.

The first interpolation calculation for the X-axis is mathematically expressed as follows.

$$(x) \times F_1 \times 1/2^n = [X_1] + \frac{X_{r1}}{2^n} \quad (7)$$

where $[X_1]$ is the integer part equal to or larger than $2^n$ of ($(\alpha) \times F_1 \times \tfrac{1}{2}^n$), and $X_{r1}$ is the remainder of the formula (7) and is less than $2^n$.

The integer $[X_1]$ is applied to the converter 114, which provides the interpolation pulses for the X-axis to the drive motor 118 through the servo-circuit 116. The value $X_{r1}$ is re-stored in the register 111 for the second interpolation calculation.

Similarly, the k'th interpolation calculation for the velocity interpolation and the X-axis interpolation is performed according to the formulas (8) and (9).

The interpolation calculation for the velocity is performed in accordance with the formula (8).

$$(f_1 \times \alpha_k + F_{r(k-1)}) \times \frac{1}{2^n} = [F_k] + \frac{F_{rk}}{2^n} \quad (8)$$

where $F_k$ is the integer part of the k'th interpolation calculation and is equal to or larger than $2^n$, and $F_{rk}$ is the remainder of the calculation in the formula (8) and is smaller than $2^n$.

And the interpolation calculation for the X-axis is performed in accordance with the formula (9).

$$(x \times F_{kx} + X_{r(k-1)}) \times \frac{1}{2^n} = [X_k] + \frac{X_{rk}}{2^n} \quad (9)$$

where $[X_k]$ is the integer part of the k'th interpolation calculation and is equal to or larger than $2^n$, and $X_{rk}$ is the remainder of the calculation in the formula (9) and is smaller than $2^n$.

The above calculation is repeated, and when the interpolation calculations have been repeated (k) times, the total interpolation pulses ($F_i$) for the velocity interpolation is $2^n$ as shown in the formula (10)

$$\sum_{i=1}^{k} F_i = f_1 \times \sum_{i=1}^{k} \alpha_i \times \frac{1}{2^n} = \frac{f \cdot 2^n}{\sqrt{x^2 + y^2}} \times \sum_{i=1}^{k} \alpha_i \times \frac{1}{2^n}$$

$$= \frac{f \cdot 2^n}{\sqrt{x^2 + y^2}} \times 2^n \times \frac{\sqrt{x^2 + y^2}}{f} \times \frac{1}{2^n} = 2^n \quad (10)$$

In the formula (10), it should be appreciated that the formula $$\sum_{i=1}^{k} \alpha_i = m = 2^n \times \frac{\sqrt{x^2 + y^2}}{f}$$

is satisfied as shown in the formulae (3) and (4).

The formula (10) shows that the total of the velocity interpolation pulses is $2^n$ in t seconds even if the instruction pulses are grouped to (k) groups.

Further, the total of the interpolation pulses for the X-axis is derived from the formula (10) and is shown in the formula (11).

$$\sum_{i=1}^{k} X_i = x \times \sum_{i=1}^{k} F_i \times \frac{1}{2^n} = x \times 2^n \times \frac{1}{2^n} = x \quad (11)$$

The formula (11) shows that (x) number of interpolation pulses are obtained in accordance with the value of the content of the integrand register 107 during (k) repeats of the interpolation calculations.

The interpolation calculation in the Y-axis is similar, and is performed using the content $\alpha_i$ in the register 103 each time the X-axis interpolation calculation is finished.

Now, the numerical embodiment will be explained for easy understanding of the operation of the present invention.

Figure 5:
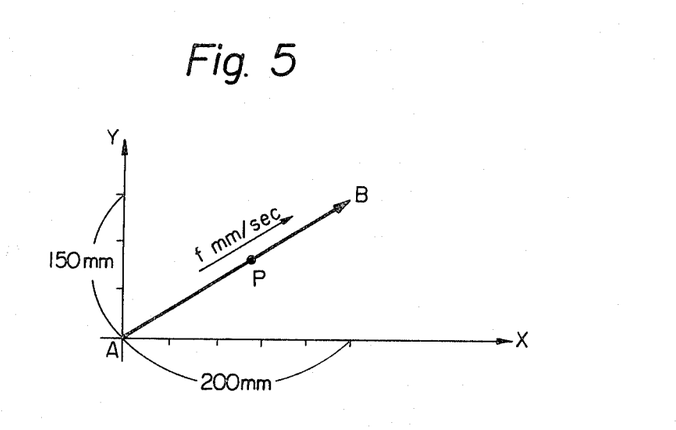
FIG. 5 is an explanatory drawing of the operation of the apparatus in FIG. 4.

It is assumed that the moving length in (x) direction is $200_{mm}$, the moving length in (y) direction is $150_{mm}$, and the moving step for each pulse is $1_{mm}$/pulse as shown in FIG. 5. Further it is assumed that each integrand register and each remainder register have eight bit positions, that is to say, each register can store a value up to $2^8 - 1$ (=255).

First, the interpolation calculation in the prior circuit shown in FIG. 2 is shown in table 1, in which f=39, and $$f_1 = 40 \left(= f \times \frac{2^n}{\sqrt{x^2 + y^2}} = 39 \times \frac{256}{\sqrt{200^2 + 150^2}} \right)$$

are assumed. In the table 1, the column (a) shows the reference instruction pulses from the pulse generator 17, the column (b) shows the velocity interpolation calculation in the circuit 10, the column (c) shows the velocity interpolation pulse on the output line 29, the column (d) shows the X-axis interpolation calculation in the circuit 11, the column (e) shows the interpolation pulses in the X-direction on the output line 30, the column (f) shows the Y-axis interpolation calculation in the circuit 12, and the column (g) shows the interpolation pulses in the Y-direction on the output line 31.

First, the velocity interpolation calculation is performed (see column (a)), and at the seventh calculation the result exceeds $256(=2^8)$, and then an overflow pulse occurs (see column (b)). The overflow pulses in the column (b) are utilized as instruction pulses for the interpolation calculations in both the X- and Y-directions, that is to say, the interpolation calculations on the columns (d) and (f) are performed only when the column (b) provides the output (l). At the thirteenth instruction pulse, the circuits 11 and 12 provide an overflow pulse as shown in the columns (e) and (g), and those overflow pulses are applied to the drive motors as interpolation pulses.

Figure 6:
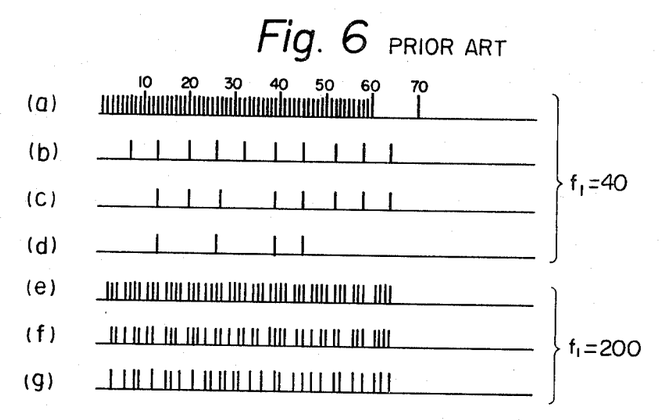

The output pulses in the table 1 are shown in FIG. 6(a), (b), (c) and (d) for $f_1=40$, as a pulse train. FIG. 6(a) shows the reference instruction pulses from the pulse generator 17 (see column (a) in the table (1), FIG. 6(b) shows the overflow pulses for the velocity interpolation calculation on the output line 29 (see column (c) of the table (1), where $f_1=40$, FIG. 6(c) shows the overflow pulses for the X-axis interpolation calculation on the output line 30 (see column (e) of the table (1) where $f_1=40$, and FIG. 6(d) shows the interpolation pulses for the Y-axis on the output line 31 (see column (g) of the table (1) where $f_1=40$.

Table 1

| (a) | (b) | (c) | (d) | (e) | (f) | (g) |
|---|---|---|---|---|---|---|
| 1 | 0 + 40 = 40 | | | | | |
| 2 | 40 + 40 = 80 | | | | | |
| 3 | 80 + 40 = 120 | | | | | |
| 4 | 120 + 40 = 160 | | | | | |
| 5 | 160 + 40 = 200 | | | | | |
| 6 | 200 + 40 = 240 | | | | | |
| 7 | 240 + 40 = 24 + 256 | 1 | 0 + 200 = 200 | 0 | 0 + 150 = 150 | 0 |
| 8 | 24 + 40 = 64 | | | | | |
| 9 | 64 + 40 = 104 | | | | | |
| 10 | 104 + 40 = 144 | | | | | |
| 11 | 144 + 40 = 184 | | | | | |

Table 1-continued

| (a) | (b) | (c) | (d) | (e) | (f) | (g) |
|---|---|---|---|---|---|---|
| 12 | 184 + 40 = 224 | | | | | |
| 13 | 244 + 40 = 8 + 256 | 1 | 200 + 200 = 144 + 256 | 1 | 150 + 150 = 41 + 256 | 1 |
| 14 | 8 + 40 = 48 | | | | | |
| 15 | 48 + 40 = 88 | | | | | |
| 16 | 88 + 40 = 128 | | | | | |
| 17 | 128 + 40 = 168 | | | | | |
| 18 | 168 + 40 = 208 | | | | | |
| 19 | 208 + 40 = 248 | | | | | |
| 20 | 248 + 40 = 32 + 256 | 1 | 144 + 200 = 88 + 256 | 1 | 44 + 150 = 194 | |
| 21 | 32 + 40 = 72 | | | | | |
| 22 | 72 + 40 = 112 | | | | | |
| 23 | 112 + 40 = 152 | | | | | |
| 24 | 152 + 40 = 192 | | | | | |
| 25 | 192 + 40 = 232 | | | | | |
| 26 | 232 + 40 = 16 + 256 | 1 | 88 + 200 = 32 + 256 | 1 | 194 + 150 = 88 + 256 | 1 |
| 27 | 16 + 40 = 56 | | | | | |
| 28 | 56 + 40 = 96 | | | | | |
| 29 | 96 + 40 = 136 | | | | | |
| 30 | 136 + 40 = 176 | | | | | |
| 31 | 176 + 40 = 216 | | | | | |
| 32 | 216 + 40 = 0 + 256 | 1 | 32 + 200 = 232 | 0 | 88 + 150 = 238 | |
| 33 | 0 + 40 = 40 | | | | | |
| 34 | 40 + 40 = 80 | | | | | |
| 35 | 80 + 40 = 120 | | | | | |
| 36 | 120 + 40 = 160 | | | | | |
| 37 | 160 + 40 = 200 | | | | | |
| 38 | 200 + 40 = 240 | | | | | |
| 39 | 240 + 40 = 24 + 256 | 1 | 232 + 200 = 176 + 256 | 1 | 238 + 150 = 132 + 256 | |
| 40 | 24 + 40 = 64 | | | | | |
| 41 | 64 + 40 = 104 | | | | | |
| 42 | 104 + 40 = 144 | | | | | |
| 43 | 144 + 40 = 184 | | | | | |
| 44 | 184 + 40 = 224 | | | | | |
| 45 | 244 + 40 = 8 + 256 | 1 | 176 + 200 = 120 + 256 | 1 | 132 + 150 = 26 + 256 | 1 |
| 46 | 8 + 40 = 48 | | | | | |
| 47 | 48 + 40 = 88 | | | | | |
| 48 | 88 + 40 = 128 | | | | | |
| 49 | 128 + 40 = 168 | | | | | |
| 50 | 168 + 40 = 208 | | | | | |
| 51 | 208 + 40 = 248 | | | | | |
| 52 | 248 + 40 = 32 + 256 | 1 | 120 + 200 = 64 + 256 | 1 | 26 + 150 = 176 | 0 |
| 53 | 32 + 40 = 72 | | | | | |
| 54 | 72 + 40 = 112 | | | | | |
| 55 | 112 + 40 = 152 | | | | | |
| 56 | 152 + 40 = 192 | | | | | |

For comparison, the pulse trains where $f_1=200$ in the prior art are shown in FIG. 6(e), (f) and (g). FIG. 6(e) is the velocity interpolation pulses when $f_1=200$, FIG. 6(f) shows the X-axis interpolation pulses when $f_1=200$, and FIG. 6(g) shows the Y-axis interpolation pulses when $f_1=200$. Comparing the pulse trains (e), (f) and (g) with those (b), (c) and (d), respectively, it should be noted that the pulse density of the former is five times as dense as that of the latter. That is to say, the digital circuit in the prior art, when $f_1=200$, must operate five times as fast as when $f_1=40$.

The table 2 shows the interpolation calculation according to the present invention shown in FIG. 4, supposing that $f_1=40$ (f=39), x=200, and y=150. In the table 2, the column (a) shows the reference instruction pulses from the pulse generator 101 in FIG. 4, the column (b) shows the output of the counter 102, the column (c) shows the velocity interpolation calculation, the column (d) shows the velocity interpolation pulses ($F_i$), the column (e) shows the X-axis interpolation calculation, the column (f) shows the X-axis interpolation pulses ($X_i$), the column (g) shows the Y-axis interpolation calculation, and the column (h) shows the Y-axis interpolation pulses ($Y_i$).

In FIG. 4, the reference instruction pulses from the pulse generator 101 are counted in the counter 102, and when the content of the counter 102 reaches $\alpha_i$, the velocity interpolation calculation is performed in accordance with the formula (8). It should be appreciated that value $\alpha_i$ may be arbitrary and in the embodiment of the table 2

$$\alpha_1=6, \alpha_2=8, \alpha_3 9, \alpha_4=6, \alpha_5=11, \alpha_6=6, \alpha_7=10.$$

When the content ($\alpha_i$) of the counter 102 is transferred to the register 103, the counter 102 is reset to zero and the counter 102 counts the pulses for the next interpolation cycle.

Using the content of the register 103 and the content $f_1(=40$ in the present embodiment) in the register 106, calculation of the formula (8) is performed. And the integer equal to or larger than $2^8(=256)$ obtained through the calculation is re-stored in the register 103 as $F_i$, and the remainder less than $2^8(=256)$ is stored in the register 110. The content of the register 103 (which is $F_i$) and the value x(=200) in the register 107 are multiplied by the multiplier 104, and the product of this multiplication is added to the content of the register 111 by the adder 105 in accordance with the formula (9). As a result of this X-axis interpolation calculation, the integer equal to or larger than $2^8(=256)$ is provided on the output line 122 as an X-axis interpolation code, which is converted to a train of the interpolation pulses by the converter 114. The interpolation pulses thus obtained are applied to the drive motor 118 through the servo-circuit 116.

Similarly, the Y-axis interpolation calculation is performed and the Y-axis interpolation pulses are obtained as shown in the column (h) of the talbe 2.

Figure 7:
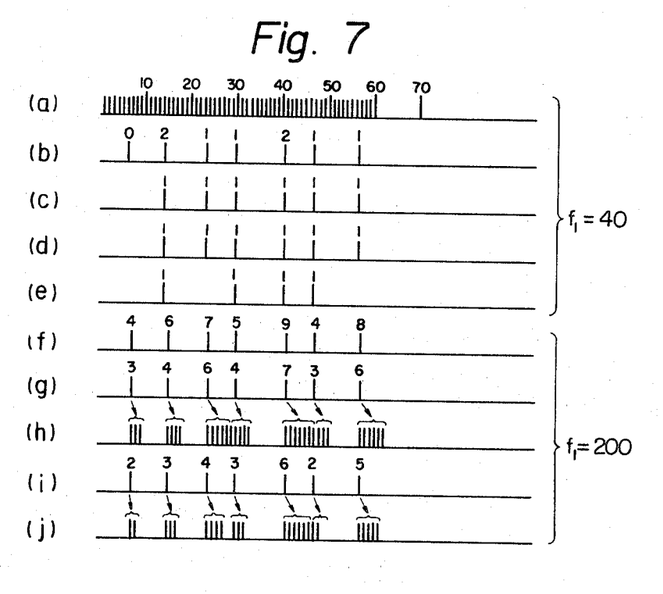

(d) of the table 2. FIG. 7(c) shows the output of the adder 105 in the X-direction, and the numeral indicated at the top of each pulse shows the number of X-direction interpolation pulses ($X_i$). The numeral in FIG. 7(c) is the same as that of the column (f) of the table 2. FIG.

Table 2

| (a) | (b) $a_i$ | (c) $f_1 = 40$ $\{f_i \times a_i + F_{r(i-1)}\}\frac{1}{2^n}$ | (d) $F_i$ | (e) (X) x = 200 $\{x \times F_i + X_{r(i-1)}\}\frac{1}{2^n}$ | (f) $X_i$ | (g) y = 150 $\{y \times F_i + Y_{r(i-1)}\}\frac{1}{2^n}$ | (h) |
|---|---|---|---|---|---|---|---|
| 1 | 1 | | | | | | |
| 2 | 2 | | | | | | |
| 3 | 3 | | | | | | |
| 4 | 4 | | | | | | |
| 5 | 5 | | | | | | |
| 6 | 6 | $(40 \times 6 + 0)/2^8 = 1 + 240/2^8$ | 0 | $(200 \times 0 + 0)/2^8 = 0 + 0/2^8$ | 0 | $(150 \times 0 + 0)/2^8 = 0 + 0/2^8$ | 0 |
| 7 | 1 | | | | | | |
| 8 | 2 | | | | | | |
| 9 | 3 | | | | | | |
| 10 | 4 | | | | | | |
| 11 | 5 | | | | | | |
| 12 | 6 | | | | | | |
| 13 | 7 | | | | | | |
| 14 | 8 | $(40 \times 8 + 240)/2^8 = 2 + 48/2^8$ | 2 | $(200 \times 2 + 0)/2^8 = 1 + 144/2^8$ | 0 | $(150 \times 2 + 0)/2^8 = 1 + 44/2^8$ | 1 |
| 15 | 1 | | | | | | |
| 16 | 2 | | | | | | |
| 17 | 3 | | | | | | |
| 18 | 4 | | | | | | |
| 19 | 5 | | | | | | |
| 20 | 6 | | | | | | |
| 21 | 7 | | | | | | |
| 22 | 8 | | | | | | |
| 23 | 9 | $(40 \times 9 + 48)/2^8 = 1 + 152/2^8$ | 1 | $(200 \times 1 + 144)/2^8 = 1 + 88/2^8$ | 1 | $(150 \times 1 + 44)/2^8 = 0 + 194/2^8$ | 0 |
| 24 | 1 | | | | | | |
| 25 | 2 | | | | | | |
| 26 | 3 | | | | | | |
| 27 | 4 | | | | | | |
| 28 | 5 | | | | | | |
| 29 | 6 | $(40 \times 6 + 152)/2^8 = 1 + 136/2^8$ | 1 | $(200 \times 1 + 88)/2^8 = 1 + 32/2^8$ | 1 | $(150 \times 1 + 198)/2^8 = 1 + 88/2^8$ | 1 |
| PG (101) | | $\{f_i \times a_i + F_{i(i-1)}\}\frac{1}{2^n}$ | $F_i$ | $\{x \times F_i + X_{r(i-1)}\}\frac{1}{2^n}$ | $X_i$ | $\{y \times F_i + Y_{r(i-1)}\}\frac{1}{2^n}$ | |
| 30 | 1 | | | | | | |
| 31 | 2 | | | | | | |
| 32 | 3 | | | | | | |
| 33 | 4 | | | | | | |
| 35 | 6 | | | | | | |
| 36 | 7 | | | | | | |
| 37 | 8 | | | | | | |
| 38 | 9 | | | | | | |
| 39 | 10 | | | | | | |
| 40 | 11 | $(40 \times 11 + 136)/2^8 = 2 + 64/2^8$ | 2 | $(200 \times 2 + 32)/2^8 = 1 + 176/2^8$ | 1 | $(150 \times 2 + 88)/2^8 = 1 + 132/2^8$ | 1 |
| 41 | 1 | | | | | | |
| 42 | 2 | | | | | | |
| 43 | 3 | | | | | | |
| 44 | 4 | | | | | | |
| 45 | 5 | | | | | | |
| 46 | 6 | $(40 \times 6 + 64)/2^8 = 1 + 48/2^8$ | 1 | $(200 \times 1 + 176)/2^8 = 1 + 120/2^8$ | 1 | $(150 \times 1 + 132)/2^8 = 1 + 26/2^8$ | 1 |
| 47 | 1 | | | | | | |
| 48 | 2 | | | | | | |
| 49 | 3 | | | | | | |
| 50 | 4 | | | | | | |
| 51 | 5 | | | | | | |
| 52 | 6 | | | | | | |
| 53 | 7 | | | | | | |
| 54 | 8 | | | | | | |
| 55 | 9 | | | | | | |
| 56 | 10 | $(40 \times 6 + 48)/2^8 = 1 + 32/2^8$ | 1 | $(200 \times 1 + 120)/2^8 = 1 + 64/2^8$ | 1 | $(150 \times 1 + 26)/2^8 = 0 + 176/2^8$ | 0 |

The pulse trains generated in the calculation in the table 2 is shown in FIG. 7(a), (b), (c), (d) and (e). FIG. 7(a) is a reference pulse train generated by the reference pulse generator 101 in FIG. 4, FIG. 7(b) shows the value $a_i$ which is the output of the counter 102, corresponding to the column (b) of the table 2 and $a_i$ is generated in the present embodiment at the 6'th, 14'th, 23'th, 29'th, 40'th, 46'th, and 56'th reference pulses. The numeral (0, 2, 1, 1, 2, 1, 1) indicated at the top of each pulse of FIG. 7(b) shows the number of velocity interpolation pulses ($F_i$), and is the same as that shown in the column (d) of the table 2. FIG. 7(c) shows the output of the adder 105 in the X-direction, and the numeral indicated at the top of each pulse shows the number of X-direction interpolation pulses ($X_i$). The numeral in FIG. 7(c) is the same as that of the column (f) of the table 2. FIG. 7(d) shows the pulse train which is the output of the pulse converter 114, and it should be appreciated that the pulse train in FIG. 7(d) is the same as that in FIG. 7(c), since the instructed velocity $f_1$ is small ($f_1=40$). FIG. 7(e) shows the pulse train of interpolation pulses in the Y-direction, and it should be appreciated that the pulse train in FIG. 7(e) is almost the same as that in FIG. 6(d) which is the prior art, since the instructed velocity $f_1$ is small.

Next, the operation of the apparatus of FIG. 4 when the instructed velocity $f_1$ is fast, will be explained. In the following explanation, it is assumed that the instructed velocity $f_1=200$ (f=195.3), x=200 and y=150, and the calculation according to said assumption is shown in the table 3. In table 3, column (a) shows the output of the reference pulse generator 101, the column (b) shows the output of the counter 102, the column (c) shows the velocity interpolation calculation, the column (d) shows the velocity interpolation pulses ($F_i$), the column (e) shows the X-axis interpolation calculation, the column (f) shows the X-axis interpolation pulses ($X_i$), the column (g) shows the Y-axis interpolation calculation, and the column (h) shows the Y-axis interpolation pulses ($Y_i$). In the table 3, it is assumed that the counter 102 provides output at the 6'th, 14'th, 23'th, 29'th, 40'th, 46'th, and 56'th pulses of the reference pulse generator 101, and the value of $\alpha_i$ is $\alpha_1=6$, $\alpha_2=8(=14-6)$, $\alpha_3=9(=23-14)$, $\alpha_4=6(=29-23)$, $\alpha_5=11(=40-29)$, $\alpha_6=6(=46-40)$, $\alpha_7=10(=56-46)$, as shown in the column (b) of the table 3. The velocity interpolation calculation for each value of $\alpha_i$ is performed as shown in the column (c) of the table 3, and the velocity interpolation pulses ($F_i$) are obtained as shown in the column (d) of the table 3 ($F_i$=4, 6, 7, 5, 9, 4, 8,,,,). Using the value $F_i$ thus obtained, the interpolation calculations are performed as shown in the columns (e) and (g), and the value $X_i$(=3, 4, 6, 4, 7, 3, 6,,,) as shown in the column (f) and the value $Y_i$(=2, 3, 4, 3, 6, 2, 5,,,) as shown in the column (h) are obtained.

Table 3

| (a) | (b) | (c) $f_1 = 200$ | (d) | (e) | (f) | (g) | (h) |
|---|---|---|---|---|---|---|---|
| PG (101) | $\alpha_i$ | $\{f_i \times \alpha_i + F_{r(i-1)}\}\frac{1}{2^n}$ | $F_i$ | $\{x \times F_i + X_{r(i-1)}\}\frac{1}{2^n}$ | $X_i$ | $\{y \times F_i + Y_{r(i-1)}\}\frac{1}{2^n}$ | |
| 1 | 1 | | | | | | |
| 2 | 2 | | | | | | |
| 3 | 3 | | | | | | |
| 4 | 4 | | | | | | |
| 5 | 5 | | | | | | |
| 6 | 6 | $(200 \times 6 + 0)/2^8 = 4 + 176/2^8$ | 4 | $(200 \times 4 + 0)/2^8 = 3 + 32/2^8$ | 3 | $(150 \times 4 + 0)/2^8 = 2 + 88/2^8$ | 2 |
| 7 | 1 | | | | | | |
| 8 | 2 | | | | | | |
| 9 | 3 | | | | | | |
| 10 | 4 | | | | | | |
| 11 | 5 | | | | | | |
| 12 | 6 | | | | | | |
| 13 | 7 | | | | | | |
| 14 | 8 | $(200 \times 8 + 176)/2^8 = 6 + 240/2^8$ | 6 | $(200 \times 6 + 32)/2^8 = 4 + 208/2^8$ | 4 | $(150 \times 6 + 88)/2^8 = 3 + 220/2^8$ | 3 |
| 15 | 1 | | | | | | |
| 16 | 2 | | | | | | |
| 17 | 3 | | | | | | |
| 18 | 4 | | | | | | |
| 19 | 5 | | | | | | |
| 20 | 6 | | | | | | |
| 21 | 7 | | | | | | |
| 22 | 8 | | | | | | |
| 23 | 9 | $(200 \times 9 + 240)/2^8 = 7 + 248/2^8$ | 7 | $(200 \times 7 + 208)/2^8 = 6 + 72/2^8$ | 6 | $(150 \times 7 + 204)/2^8 = 4 + 246/2^8$ | 4 |
| 24 | 1 | | | | | | |
| 25 | 2 | | | | | | |
| 26 | 3 | | | | | | |
| 27 | 4 | | | | | | |
| 28 | 5 | | | | | | |
| 29 | 6 | $(200 \times 6 + 248)/2^8 = 5 + 468/2^8$ | 5 | $(200 \times 5 + 72)/2^8 = 4 + 48/2^8$ | 1 | $(150 \times 5 + 246)/2^8 = 3 + 228/2^8$ | 3 |
| (a) | (b) | (c) $f_1 = 200$ | (d) | (e) x = 200 | (f) | (g) y = 150 | h |
| | $\alpha_i$ | $\{f_i \times \alpha_i + F_{r(i-1)}\}\frac{1}{2^n}$ | $F_i$ | $\{x \times F_i + X_{r(i-1)}\}\frac{1}{2^n}$ | $X_i$ | $\{y \times F_i + Y_{r(i-1)}\}\frac{1}{2^n}$ | |
| 30 | 1 | | | | | | |
| 31 | 2 | | | | | | |
| 32 | 3 | | | | | | |
| 33 | 4 | | | | | | |
| 35 | 6 | | | | | | |
| 36 | 7 | | | | | | |
| 37 | 8 | | | | | | |
| 38 | 9 | | | | | | |
| 39 | 10 | | | | | | |
| 40 | 11 | $(200 \times 11 + 168)/2^8 = 9 + 64/2^8$ | 9 | $(200 \times 9 + 48)/2^8 = 7 + 56/2^8$ | 7 | $(150 \times 9 + 228)/2^8 = 6 + 42/2^8$ | 6 |
| 41 | 1 | | | | | | |
| 42 | 2 | | | | | | |
| 43 | 3 | | | | | | |
| 44 | 4 | | | | | | |
| 45 | 5 | | | | | | |
| 46 | 6 | $(200 \times 6 + 64)/2^8 = 4 + 240/2^8$ | 4 | $(200 \times 4 + 56)/2^8 = 3 + 88/2^8$ | 1 | $(150 \times 4 + 42)/2^8 = 2 + 130/2^8$ | 2 |
| 47 | 1 | | | | | | |
| 48 | 2 | | | | | | |
| 49 | 3 | | | | | | |
| 50 | 4 | | | | | | |
| 51 | 5 | | | | | | |
| 52 | 6 | | | | | | |
| 53 | 7 | | | | | | |
| 54 | 8 | | | | | | |
| 55 | 9 | | | | | | |

Table 3-continued

| 56 | 10 | $(200 \times 10 + 240)/2^8 = 8 + 192/2^8$ | 8 | $(200 \times 8 + 88)/2^8 = 6 + 152/2^8$ | 6 | $(150 \times 8 + 130)/2^8 = 5 + 50/2^8$ | 5 |

FIG. 7(a), (f), (g), (h), (i), (j) show the pulse trains obtained in the calculation in the table 3. FIG. 7(a) shows the reference pulse train from the output of the reference pulse generator 101, and this pulse train is the same as that explained for $f_1=40$. FIG. 7(f) shows the output $\alpha_i$ of the counter 102 and the output of the counter 102 is provided at the 6'th, 14'th, 23'th, 29'th, 40'th, 46'th and 56'th reference pulse as shown in the column (b) of the table 3. The numerals (4, 6, 7, 5, 9, 4, 8) shown at the top of each pulse of FIG. 7(f) shows the number of the velocity interpolation pulses $(F_i)$ for each value of $\alpha_i$ as shown in the column (d) of the table 3. FIG. 7(g) shows the number $(x_i)$ of X-axis interpolation pulses at the output of the adder 105, through the X-axis interpolation calculation shown in the column (e) of the table 3. The numeral at the top of each pulse of FIG. 7(g) is the same as that of the column (f) of the table 3. FIG. 7(h) shows the pulse train at the output of the X-axis converter 114. It should be appreciated that the number of pulses in FIG. 7(g) at a given time is the same as that in FIG. 6(f), although FIG. 7(g) provides a plurality of pulses at the same time. Also, it should be appreciated that the interpolation pulses in FIG. 7(g) provide smooth movement of a machine tool although some interpolation pulses are provided at the same time, since the instruction velocity $(f_1)$ is high. Similarly, FIG. 7(i) shows the Y-axis interpolation pulses and FIG. 7(j) shows the pulse train of the Y-axis interpolation pulses, as shown in the column (h) of the table 3.

It should be noted that the value $\alpha_i$ which is the output of the counter 102 can be an integer larger than 2. Accordingly, the multiplier 104 in FIG. 4 can carry out any job including not only the velocity interpolation calculation defined by the formula (8) and the axes interpolation calculation defined by the formula (9), but also other jobs like the control of selection of a bit for the next cutting process. And it should be noted that the time required for carrying out said second job depends upon each job. Even if a reference pulse is generated in the pulse generator 101 during the time in which the multiplier 104 is occupied with another job, said reference pulse is not lost but is counted in the counter 102. And, after the multiplier 104 finishes the other job, an interpolation calculation is carried out using the value $\alpha_i$ stored in the counter 102. And of course we can obtain the interpolation pulses as if no interruption of the multiplier 104 occured. Accordingly, the presence of the counter 102 is the important feature of the present invention.

According to the above nature of the present invention, the interpolation calculation of the present invention can be carried out by using a programmed general-purpose microcomputer, which performs not only the interpolation calculation but also other jobs for controlling a machine tool. Although the computer is occupied by another job for some time, the computer can perform the interpolation calculation correctly after said job is finished, using the content of the counter 102.

As mentioned above, the present invention performs several interpolation calculations at the same time. Therefore, even when the instruction pulses are very fast, the interpolation calculation can be carried out using a low speed digital circuit element, thus, the price of the interpolation system can be reduced. Further, the interpolation calculation of the present invention can be carried out by a general-purpose computer, which can be used for other jobs.

From the foregoing it will now be apparent that a new and improved interpolation system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A pulse interpolation system comprising
    (a) a pulse generator for providing reference instruction pulses,
    (b) a counter for counting the pulses from the pulse generator,
    (c) a register for storing the content of said counter and for resetting said counter to zero,
    (d) a first register group for storing a predetermined value from a programmed instruction tape,
    (e) a second register group for storing a temporary value,
    (f) a multiplier for providing the product of the output of the first register group and the output of said register,
    (g) an adder for obtaining the sum of the output of the second register group and the product of said multiplier and applying the remainder of the sum of the addition to said second register group with the integer part of the addition producing an output interpolation numeral,
    (h) a converter for changing said interpolation numeral to interpolation pulses,
    (i) means responsive to said converter for operating through an interpolation cycle.

2. A pulse interpolation system according to claim 1, wherein the first register group and the second register group each have a plurality of registers and switching means for selecting one of the outputs of the registers.

3. A pulse interpolation system according to claim 1, wherein there is provided a programmed digital computer including said multiplier and adder.

4. A pulse interpolation system comprising;
    (a) a pulse generator for providing reference instruction pulses,
    (b) a counter for counting the pulses from the pulse generator,
    (c) a register for storing the content of said counter at the initial stage and for storing an interger part of an addition,
    (d) a first register group having a first register $(IR(f_1))$, a second register $(IR(x))$, a third register $(IR(y))$ and switching means for selecting one of the outputs of said three registers, means coupling a programmed tape to the first register group for providing the content of the first register group,
    (e) a second register group having a first register $(RR(f_1))$, a second register $(RR(x))$, a third register $(RR(y))$ and switching means for selecting one of the outputs of said three registers,
    (f) a multiplier for providing the product of the output of the first register group and the output of said register, (g) an adder for obtaining the sum of the output of the second register group and the product of said multiplier, and applying the remainder of the sum of the addition to said second register group with the integer part of the addition being applied to said register in an interpolation calculation cycle and producing an output interpolation numeral in an X- and Y- axes interpolation cycle, (h) a converter for changing said interpolation numeral to interpolation pulses, (i) means responsive to said converter for operating through an interpolation calculation cycle.

5. A method for producing interpolation pulses comprising the steps of generating reference instruction pulses having a constant period, counting said pulses by a counter, storing the output of the counter in a register, providing a product of an instructed value and the content of said register, providing the sum of said product and the content of a remainder register and applying the remainder of the sum of the addition to said remainder register with the integer part of the addition producing an output interpolation numeral, converting said output interpolation numeral to interpolation pulses, and responding to said interpolation pulse train for operating through an interpolation cycle.

* * * * *